(12) United States Patent
Sundberg

(10) Patent No.: US 6,921,885 B2
(45) Date of Patent: *Jul. 26, 2005

(54) METHOD OF INCREASING THE USEFUL LIFE OF A MOLYBDENUM SILICIDE HEATING ELEMENT

(75) Inventor: Mats Sundberg, Västerås (SE)

(73) Assignee: Sandvik AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/381,643
(22) PCT Filed: Nov. 20, 2001
(86) PCT No.: PCT/SE01/02563
§ 371 (c)(1), (2), (4) Date: Mar. 26, 2003
(87) PCT Pub. No.: WO02/43440
PCT Pub. Date: May 30, 2002

(65) Prior Publication Data
US 2004/0094535 A1 May 20, 2004

(30) Foreign Application Priority Data
Nov. 24, 2000 (SE) .............................................. 0004329

(51) Int. Cl.⁷ .............................................. H05B 3/10
(52) U.S. Cl. ........................ 219/553; 219/547; 29/610.1
(58) Field of Search ................................. 219/547, 548, 219/552, 553; 29/613, 611, 610.1; 428/446, 699; 429/52, 199, 221; 501/96.3; 438/121; 419/38

(56) References Cited

U.S. PATENT DOCUMENTS

| 3,665,594 A | * | 5/1972 | Raithel ........................ 438/121 |
| 3,859,219 A | * | 1/1975 | Hotten ........................ 508/259 |
| 3,945,111 A | * | 3/1976 | Greeson et al. ............. 228/175 |
| 4,486,651 A | * | 12/1984 | Atsumi et al. ............... 219/553 |
| 5,186,918 A | * | 2/1993 | Skeels et al. ................ 423/718 |
| 5,233,166 A | * | 8/1993 | Maeda et al. ................ 219/552 |
| 5,429,997 A | * | 7/1995 | Hebsur ....................... 501/96.3 |
| 5,456,878 A | * | 10/1995 | Tadokoro et al. ............. 419/38 |
| 5,611,953 A | | 3/1997 | Sekhar et al. ................ 219/553 |
| 5,756,215 A | * | 5/1998 | Sawamura et al. ......... 428/446 |
| 6,211,496 B1 | * | 4/2001 | Uchiyama et al. .......... 219/548 |
| 2002/0028360 A1 | * | 3/2002 | Shaffer et al. .............. 428/699 |

FOREIGN PATENT DOCUMENTS

| DE | 199 06 720 A1 | 9/1999 |
| WO | WO 89/02647 | 3/1989 |
| WO | WO 99/02013 | 1/1999 |

* cited by examiner

Primary Examiner—Robin O. Evans
Assistant Examiner—Leonid Fastovsky
(74) Attorney, Agent, or Firm—Alfred J. Mangels

(57) ABSTRACT

A method of increasing the useful life of heating elements that consist essentially of molybdenum silicide and alloys thereof, wherein the heating elements operate at high temperatures in heat treatment processes and generally rest against the floor and/or the ceiling of a furnace. The heating elements contain aluminum to an extent sufficient to maintain a stable, slowly growing layer of aluminum oxide on the surfaces of the heating elements, and the heating elements are placed in direct abutment with an aluminum oxide brick material.

3 Claims, 1 Drawing Sheet

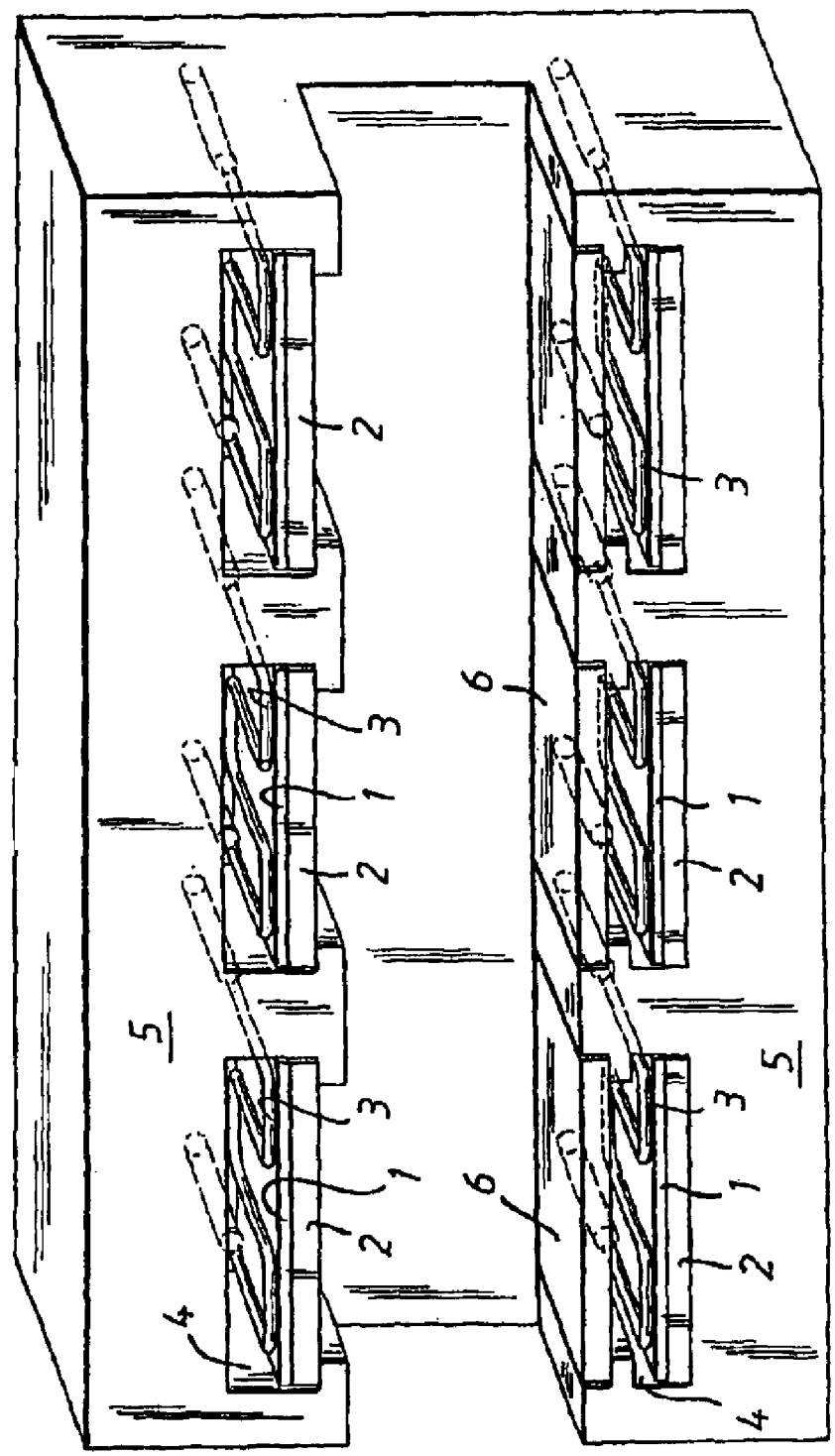

METHOD OF INCREASING THE USEFUL LIFE OF A MOLYBDENUM SILICIDE HEATING ELEMENT

BACKGROUND OF THE INVENTION

1. Field of the Invention

The present invention relates to a method of increasing the useful length of life of heating elements when heat treating electronic ceramics. Such ceramics may be ferrites (magnetic ceramics) and titanates (e.g., $BaTiO_3$).

More specifically, the invention pertains to elements of the types molybdenum silicide and molybdenum tungsten silicide, including different alloys of these basic materials. Such elements are manufactured by applicants in a number of designs.

2. Description of the Related Art

Electronic ceramics are at present used in a number of applications in, e.g., optronics, mobile telephony and vehicle electronics. Electronic ceramics that have a perovskite structure have dielectric, piezoelectric, and ferroelectric properties, among other things. Examples of such materials include $BaTiO_3$ and $Pb(Zr, Ti)O_3$. Components that are typically manufactured from such materials are resonators, filters, and capacitors. The capacitors are produced in the form of so-called multi-layer capacitors (MLCC) for example. The ceramics are often brought into contact with a metallic conductor, such as nickel, in the heat treatment stage.

When such heating elements are used in the manufacture of so-called electronic ceramics, the elements are often placed on a supportive surface and heated respectively from the floor and ceiling of continuous sintering furnaces. A long preferred design of heating elements in such furnaces, for instance furnaces of the so-called Riedhammer type for so-called ferrite sintering furnaces, are so-called 4-arm meander elements measuring 6/12 mm on the heating zone and connection part respectively.

Such elements rest typically on a supportive gravel layer of aluminum-silicate particles, which, in turn, rests on a brickwork of purely aluminum oxide. The aluminum silicate, which is compatible (does not react chemically) with heating elements of $MoSi_2$ up to a temperature of 1600° C., is of the type sillimannite and mullite, respectively. Sillimannite and mullite can be used for a long period of time before a reaction takes place with the $SiO_2$-layer that develops on the surface of $MoSi_2$ elements. This is because the aluminum silicate reacts more slowly with the $SiO_2$-layer than the aluminum oxide brick. This reaction causes aluminum to be alloyed in the $SiO_2$-layer, therewith weakening the ability of the layer to protect the element material, resulting in a shorter life length of the element.

Subsequent to this reaction with the surface layer a reaction also takes place in the bulk material of the heating element, resulting in further corrosion and weakening.

In the absence of said particle layer, or gravel bed, a quicker reaction will take place by virtue of the $SiO_2$ on the surface of the element being in direct contact with the $Al_2O_3$-brick.

Many electronic ceramics are heat treated at furnace temperatures ranging from 1200 to 1500° C. and higher. In addition to nitrogen gas, the atmosphere also typically contains about 5% hydrogen gas that has a varying dew point. For instance, the dew point may be +20° C.

It has been noted that in many cases the useful life length of said elements falls significantly beneath the expected 3–5 year span, and in some cases only extends to a few months. The cause of local life length problems is the aggressive hydrogen gas that reacts with the gravel bed such as to form a smelt that contains chiefly aluminum silicate. The heating element sinks down in the smelt, and an increase in temperature takes place with accelerated corrosion and temperature increase of the elements as a result. Moreover, the gravel bed sinters firmly into the aluminum oxide brick. The problem can also occur in atmospheres that do not contain hydrogen gas, wherein the element buries down into the particle layer as a result of temperature changes and therewith dimensional changes.

The gravel bed, or particle layer, also makes manufacture, transportation, and furnace servicing more difficult to carry out.

It is therefore desired to eliminate the gravel bed from the process. The present invention fulfils this desire.

SUMMARY OF THE INVENTION

The present invention thus relates to a method of increasing the useful life of heating elements that are comprised essentially of molybdenum disilicide and of alloys of this basic material, where said elements operate at high temperatures in heat treatment processes, and where said elements rest on the floor and/or against the ceiling of a furnace. The method includes causing said heating elements to lie in direct abutment with the aluminum oxide brick. The heating element material contains molybdenum suicide and alloys thereof, and said material is caused to contain aluminum in an amount sufficient to maintain a stable, slowly growing layer of aluminum oxide on the surface of respective heating elements.

BRIEF DESCRIPTION OF THE DRAWING

The invention will now be described in more detail, partly with reference to the accompanying drawing, where FIG. 1 illustrates a furnace design in which the invention is applied.

DESCRIPTION OF THE PREFERRED EMBODIMENTS

FIG. 1 illustrates part of a furnace of the kind concerned. The drawing represents a segment, e.g., a heating zone, of a so-called through-pushing furnace in which the material passes through the space between the heating elements on, for instance, a ceramic tray that is pushed forward on rails, for instance.

For heating the material from above, a gravel layer or bed of particles 1 is placed on an aluminum oxide plate 2. A four-arm heating element 3 is placed on top of the particle bed. A "heating cassette" including aluminum oxide brick-gravel bed-elements is pushed into a compartment/shelf plane 4 in surrounding brick insulation 5. The same procedure is used for elements that are heated from above and from below, with the difference that when heating from below there is used an upper aluminum oxide plate 6. Naturally, other furnace constructions can be used that apply the principle in which the element rests on a gravel bed.

The present invention relates to a method of increasing the useful life of heating elements that consist essentially of molybdenum disilicide and alloys of this basic material, where said elements operate in the heat treatment process at high temperatures in, e.g., a corrosive atmosphere that contains hydrogen gas, and where said elements rest against the furnace floor and/or lie in abutment with the furnace ceiling.

In the case of the illustrated embodiment, the heating elements 3 are in direct abutment with aluminum oxide brick. This means that the gravel bed 1 in FIG. 1 is excluded in accordance with the invention.

The material from which the heating element 3 is formed includes molybdenum silicide and alloys thereof, said material being caused to contain sufficient aluminum to maintain a stable, slowly growing layer of aluminum oxide on the surface of the heating element.

In the case of this embodiment there is thus obtained a slowly growing layer of aluminum oxide that is stable in the temperature range relevant in respect of the heat treatment of electronic ceramics.

According to one preferred embodiment, the material from which the heating element is formed includes $Mo(Si_{1-x}Al_x)_2$, and also contains an aluminum sufficiency.

According to one embodiment, x is in the order of 0.2–0.6.

It is preferred that x lies in the range of 0.40–0.50. This results in a stable oxide layer while, at the same time, providing a composition that is highly temperature durable and has good mechanical properties.

According to one preferred embodiment of the invention, the heating element material contains up to 40% by volume $Al_2O_3$. The aluminum oxide constitutes an element mechanical stabilizing phase and counteracts abnormal particle size enlargement of the aluminosilicide phase.

The inventive method thus obviates the need for a gravel layer, therewith facilitating manufacture, transportation, and furnace servicing. The reason why a gravel layer is not required is because aluminum oxide lies against aluminum oxide.

Furthermore, the risk of corrosion of the system, heating element/gravel layer/aluminum oxide brick, is reduced, therewith greatly extending the useful life of the heating elements and thereby minimizing operational disturbances.

The suitability of the element material in the aforesaid context is based on the inherent property of the $Al_2O_3$ ceramic to resist corrosion in corrosive environments up to very high temperatures.

The present invention shall not be considered to be limited to the described type of furnace, but can be applied with other types of furnaces where the aforesaid problems exist.

What is claimed is:

1. A method of increasing the useful life of heating elements that consist essentially of molybdenum silicide, wherein said elements operate at temperatures higher than about 1200° C. in heat treatment processes, said method comprising the steps of:

providing a heating element formed from a material selected from the group consisting of molybdenum silicide, alloys of molybdenum silicide, adding to the heating element material aluminum in a form and in an amount sufficient to maintain a stable, slowly growing layer of aluminum oxide on the surface of the heating element; and positioning the heating element within a furnace to lie in direct abutment with an aluminum oxide brick material, wherein the heating element material contains $Mo(Si_{1-x}Al_x)_2$, wherein x lies in the range of 0.2–0.6.

2. A method according to claim 1, wherein x lies in the range of 0.40–0.50.

3. A method according to claim 1, wherein the heating element material contains up to 40% by volume $Al_2O_3$.

* * * * *